United States Patent [19]

Watson

[11] Patent Number: 4,572,783
[45] Date of Patent: Feb. 25, 1986

[54] CYCLONIC SEPARATOR WITH SCREEN AND BALL CHECK

[75] Inventor: Cedric H. Watson, Mayfield Hts., Ohio

[73] Assignee: Aquatech, Inc., Cleveland, Ohio

[21] Appl. No.: 695,680

[22] Filed: Jan. 28, 1985

[51] Int. Cl.⁴ ............................................. B04C 5/00
[52] U.S. Cl. ................................. 210/109; 210/117; 210/304; 210/512.1
[58] Field of Search ............... 210/109, 111, 117, 119, 210/136, 304, 311, 512.1; 55/216, 459 R, 460

[56] References Cited

U.S. PATENT DOCUMENTS

| | | | |
|---|---|---|---|
| 386,173 | 7/1888 | White | 55/216 |
| 1,847,068 | 3/1932 | Campbell | 210/117 X |
| 2,390,841 | 12/1945 | Longden | 210/304 |
| 2,466,304 | 4/1949 | Cooney | 210/136 |
| 2,533,395 | 12/1950 | Paine | 210/119 X |
| 2,671,527 | 3/1954 | Moon | 55/216 |
| 3,385,440 | 5/1968 | Ray | 210/109 |
| 3,481,474 | 12/1969 | Paulson | 210/304 |
| 3,485,370 | 12/1969 | Nozaki et al. | 210/311 X |
| 3,771,290 | 11/1973 | Stethem | 210/304 X |
| 3,802,570 | 4/1974 | Dehne | 210/311 X |
| 3,868,321 | 2/1975 | Gough | 210/512.1 X |
| 4,055,499 | 10/1977 | Laxo | 210/119 |
| 4,199,443 | 4/1980 | Tauber | 210/304 X |
| 4,312,751 | 1/1982 | Casamitjana | 210/512.1 X |
| 4,364,825 | 12/1982 | Connor, Jr. | 210/109 |

FOREIGN PATENT DOCUMENTS 1132876  7/1962  Fed. Rep. of Germany ........ 55/216

Primary Examiner—Robert Spitzer
Attorney, Agent, or Firm—Pearne, Gordon, Sessions, McCoy, Granger & Tilberry

[57] ABSTRACT

A cyclonic device for separating entrained matter from a fluid stream under pressure includes a vortex chamber having a longitudinally upright cylindrical part and a subjacent frusto-conical part. Inlet and outlet means are provided for causing the fluid stream to flow first in a downward spiral and then along an ascending vortex. The entrained matter is separated from the fluid stream by centrifugal and inertial forces acting thereon from the swirling fluid flow. A cylindrical filter screen is provided concentrically disposed within the chamber and defines an area through the ascending vortex flows. The filter screen further separates relatively less dense matter from the fluid stream prior to the fluid flowing along the ascending vortex. A freely buoyant spherical ball is provided which acts as a check valve to close the chamber outlet means when a predetermined level of separated matter accumulates in the chamber. The filter screen encloses the ball and loosely constrains the ball to a direction of movement towards the chamber outlet.

11 Claims, 3 Drawing Figures

U.S. Patent  Feb. 25, 1986  4,572,783
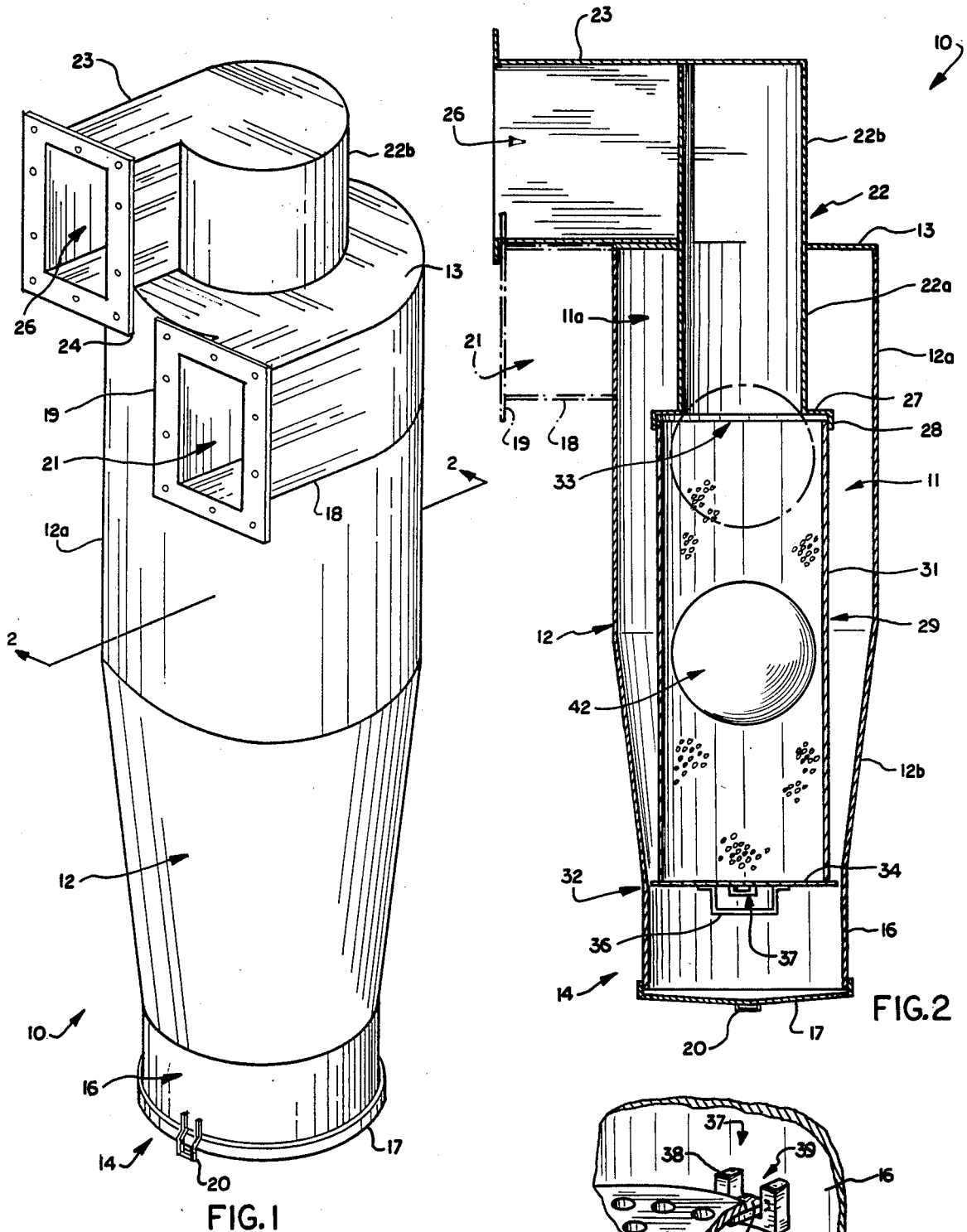
FIG.1
FIG.2
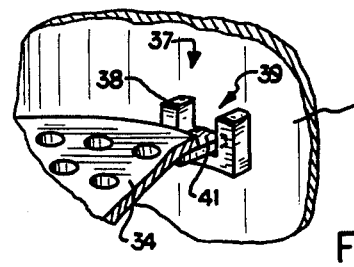
FIG.3

CYCLONIC SEPARATOR WITH SCREEN AND BALL CHECK

BACKGROUND OF THE INVENTION

1. Technical Field

The present invention relates generally to apparatus for removing or separating relatively dense material from a fluid stream. More specifically, the invention relates to separators of the centrifugal action type which force the fluid stream to flow in a constrained vortex.

2. Description of Related Art

The use of cyclonic separators for the separation and collection of waste material and other relatively dense matter from a fluid stream is well known and need only be briefly described herein. Generally, a cyclone device receives a fluid stream under pressure having entrained matter therein and causes the fluid stream to spin in a downward spiral. As the fluid moves downwardly, the cyclonic phenomenon occurs and an ascending vortex is developed rising through the center of the cyclone chamber. Separation of the entrained matter generally results from centrifugal and inertial forces causing the entrained matter to be thrown outwardly so that the fluid which enters the ascending vortex is relatively free of the relatively denser entrained matter. Examples of cyclonic devices known heretofore are shown in U.S. Pat. No. 4,397,741 issued to Miller and U.S. Pat. No. 3,568,837 issued to Laval.

The separation effectiveness is known to be improved by providing a filter material within the chamber to further separate entrained material. Such devices are shown in U.S. Pat. No. 3,807,568 issued to Ruthrof; U.S. Pat. No. 3,771,290 issued to Stethem; U.S. Pat. No. 2,511,967 issued to Campbell and the Laval '837 patent noted above.

Control mechanisms for shutting off a cyclone device which utilize a float are shown in U.S. Pat. No. 4,312,751 issued to Casamitjana; U.S. Pat. No. 3,868,321 issued to Gough and U.S. Pat. No. 3,499,531 issued to Feasel.

Though the devices known heretofore can be used to achieve separation, their relative complexity makes them undesirable both from a cost aspect and a reliability aspect. It is apparent that the need has long existed for a separation device which is mechanically simple to manufacture, has a minimum number of operational parts and provides efficient separation of entrained material from a fluid stream.

SUMMARY OF THE INVENTION

The present invention provides a new and useful device for separating entrained matter from a fluid stream. According to one aspect of the invention, a device is shown which receives such a fluid stream under pressure and causes the fluid to flow first in a downwardly spiraling motion and then through an ascending vortex. The centrifugal forces applied to the entrained matter as the fluid swirls downwardly causes separation of the matter from the fluid stream.

According to another aspect of the invention, a cyclonic device is shown which provides a filtering screen disposed generally about the region of the ascending vortex to further separate entrained matter. A ball check valve is also provided which stops the operation of the cyclonic device when a predetermined quantity of separated matter accumulates in the device.

Still another aspect of the invention, a device is shown having a simplified yet highly reliable structure including the novel arrangement of a ball float loosely constrained by a filter screen to a direction of movement towards an outlet of the device to close the outlet when a predetermined quantity of separated material accumulates in the device.

In general, a device for separating entrained matter from a fluid stream includes a vortex chamber having inlet means for receiving the fluid stream and adapted to direct the fluid stream first to flow generally downwardly and then in an ascending vortex to an outlet in the chamber. Filter means is provided for further separating the entrained matter from the fluid stream, and the filter means is disposed in the chamber generally about an area through which the ascending vortex flows. Float means is also provided for closing the chamber outlet, which float means is freely displacable upwardly as separated matter accumulates in the chamber. The filter means loosely constrains the float means to movement generally towards the chamber outlet.

BRIEF DESCRIPTION OF THE DRAWINGS

FIG. 1 is a schematic perspective view of a device embodying the concepts of the present invention;

FIG. 2 is a longitudinally sectioned elevation of the device shown in FIG. 1 taken substantially along line 2—2; and FIG. 3 is an enlarged perspective view of a filter screen retaining mechanism used with the device shown in FIG. 1.

DESCRIPTION OF THE PREFERRED EMBODIMENT

A device for separating entrained solid matter from a fluid stream under pressure is generally indicated by the numeral 10 in FIGS. 1–3. Such a device includes a longitudinally upright cyclone or vortex chamber 11 defined by a metal casing or wall 12 which preferably is made of non-corrosive 10 gauge steel.

The chamber wall 12 includes a generally cylindrical part 12a closed at the top thereof in a fluidtight manner by a top plate 13 which may be made integral with the cylinder 12a. The chamber wall 12 also provides an inverted frusto-conical part 12b subjacent the cylindrical part 12a and closed at the apical end thereof by a clean-out assembly 14. The clean-out assembly 14 includes a cylindrical extension 16 of the frusto-conical part 12b and a bottom cover plate 17 which is removably attached in a known manner to the extension 16 by any convenient means such as a plurality of hinges 20 (FIGS. 1 and 2).

As best shown in FIG. 1, an inlet conduit 18 is provided near the vortex chamber 11 upper end. The inlet conduit 18 at one end opens tangentially into an upper region 11a of the vortex chamber and at the other end carries a flange member 19 which defines an inlet port 21. The flange 19 is provided to conveniently connect the inlet conduit 18 to a source of a fluid stream under pressure containing entrained solid matter such as, for example, a system pumping storm sewer water. The length and geometry of the inlet conduit 18 which extends beyond the outer perimeter of the chamber wall 12 can be varied in a known manner to accommodate a particular supply system being used with the device 10, it being realized that the important features are that the conduit 18 open tangentially into the chamber 11 and that the fluid stream be under sufficient pressure to cause an ascending vortex flow as will be more fully described hereinafter.

A cylindrical outlet pipe 22 is transversely mounted at approximately the midlength thereof on the top plate 13 such that a lower portion 22a of the pipe is concentrically disposed within the vortex chamber 11. The outlet pipe lower portion 22a extends into the vortex chamber 11 beyond the region 11a wherein the inlet conduit 18 opens tangentially into the chamber 11.

The outlet pipe 22 also extends along an upper portion 22b thereof outwardly from the top plate 13 and is joined with an outlet conduit 23 which opens at one end tangentially into the outlet pipe 22b as is shown in FIG. 1. The outlet conduit 23 carries a flange member 24 which defines an outlet port 26. The flange 24 is provided to conveniently connect the outlet conduit 23 to a receptacle or other system (not shown) for receiving a flow of solid-free fluid. The length and geometry of the outlet conduit 23 can be adapted in a known manner to accommodate a particular receiving system. The tangential opening from the outlet pipe 22 to the conduit 23 is preferred to maintain maximum flow pressure through the device 10.

The outlet pipe lower portion 22a carries an annular flange 27 at the lower end thereof and an annular rim 28 which extends from the outer periphery of the flange 27. The flange and rim 27/28 are appropriately sized to slidably receive one end of a removable filter screen 29 and act as a stop shoulder to minimize radial and axial movement of the screen 29.

The filter screen 29 is preferably a cylindrical structure having a longitudinal portion 31 with ⅛-inch diameter holes on 3/16-inch centers extending from the flange 27 to the apical end 32 of the frusto-conical part 12b of the vortex chamber. The screen 29 is disposed concentrically within the vortex chamber 11 along the longitudinal axis thereof. The outer diameter of the screen 29 is slightly less than the inner diameter of the extension 16 such that the screen can be axially inserted into the vortex chamber 11 through the clean-out assembly 14. The screen 29 is open at the top end 33 thereof to permit an unobstructed fluid flow therethrough to the outlet pipe 22.

The screen mesh 31 includes a horizontal bottom floor portion 34 to which is centrally attached by any convenient means a handle 36 which can be manually grasped so as to impart a clockwise or counter-clockwise rotational motion to the filter screen 29 about the longitudinal axis thereof.

The filter screen 29 is mounted within the chamber 11 by a pair of substantially identical, diametrically opposed retaining mechanisms 37, one of which is shown in an enlarged view in FIG. 3. Each mechanism 37 includes a U-shaped retaining block 38, mounted on the inner surface of the extension 16, which block provides a recessed area 39 which slidably receives a strap or tab 41 attached to the outer perimeter of the screen bottom portion 34. Each tab 41 extends radially from the screen bottom 34 and has an arcuate length appropriately sized to slide into the respective recess 39. The retaining blocks 38 are mounted in a diametrically opposed relationship on the inner surface of the extension 16 and the tabs 41 are mounted on the bottom screen 34, also in a diametrically opposed relationship. Thus, the tabs 41 engage their respective retaining blocks 38 at the same time. The tabs 41 and retaining blocks 38 cooperate to hold the screen 29 in the vortex chamber 11 and also prevent rotation of the screen 29 about the longitudinal axis thereof when the device 10 is operating.

A generally spherical ball float 42 is provided in the chamber 11 within an area circumscribed by the cylindrical perimeter of the filter screen 29. The float 42 diameter is slightly undersized with respect to the diameter of the mesh cylinder 31 so that the float is loosely constrained by the filter screen to a direction of movement along the longitudinal axis of the filter screen. The spherical float 42 is made of a suitable material such as stainless steel and is positively buoyant with respect to the entrained matter. The diameter of the outlet pipe 22 is less than the diameter of the float 42 so that the float will act as a ball check valve and close off the outlet pipe when a predetermined level of separated material accumulates.

The operation of the device will now be described with particular reference to FIG. 2. A source of a fluid stream under pressure having relatively dense entrained solid matter is connected to the inlet conduit 18. The pressurized fluid stream tangentially enters an upper portion 11a of the cylindrical part 12a of the vortex chamber. The fluid stream is thus caused to flow with a downward spin or spiralling motion as the result of the tangential entry and gravity. The spinning action causes relatively denser entrained matter to collect along the interior surface of the vortex chamber wall 12 as a result of centrifugal and inertial forces applied to the entrained matter during the downward spinning flow. The more dense the entrained matter is with respect to the fluid stream the more effective will be the cyclonic separation. The vertical component of the downward flow, as well as the force of gravity, causes the separated matter to be carried down to the bottom of the frusto-conical portion 12b.

As the fluid stream spirals downwardly, the cyclonic phenomenon occurs and an ascending vortex is developed by fluid migrating along the length of the cyclone chamber 11. The vortex has its terminal vertex at the apex of the frusto-conical member 12b. The laterally tapered frusto-conical portion is used to maintain a high spin velocity and hence a large centrifugal force near the vertex. The fluid stream exiting the outlet pipe along the ascending vortex is relatively free of entrained solid matter. By extending the outlet pipe 22a beyond the inlet region 11a, the inlet flow achieves maximum spin velocity in a vortex free region of the chamber 11.

The ascending vortex flows longitudinally within an area or region defined by the filter screen 31. The screen 31 separates relatively less dense entrained solid matter from the fluid stream, prior to migrating fluid entering the ascending vortex, which less dense matter was not separated by the centrifugal forces during the turbulent downward flow.

As separated matter accumulates in the bottom area of the frusto-conical part 12b and on the screen 29, the freely and positively buoyant float ball 42 rises and eventually reaches a position depicted in phantom in FIG. 2 whereat the ball blocks the outlet pipe 22 and the cyclone device 10 is thus stopped. The filter screen 31 loosely constrains the float 42 and assures a direction of movement generally towards the outlet pipe 22.

Cleaning of both the interior of the vortex chamber 12 and the filter screen 31 is accomplished after the fluid stream supply (not shown) has been closed off for example, by closing a shut off valve upstream, by simply removing the bottom cover plate 17 and manually grasping the handle 36. The filter screen 31 is pushed up slightly via the handle and then rotated either clockwise or counterclockwise until the tabs 41 clear their respective retaining blocks 38. The length of the screen 31 is selected to allow sufficient end play with the stop shoulder 27/28 to permit the tabs 41 to slide up and out of their respective recesses 39. The screen 31 can then be easily pulled out of the vortex chamber.

After the vortex chamber and the filter screen are prepared for use, the screen 31 is inserted by simply reversing the removal steps just described. The fluid stream supply is then opened and the device 10 resumes operation.

By way of example, the preferred embodiment shown in FIGS. 1-3 shows a vortex chamber 11 which in practice is 48 inches long, 16 inches in diameter at the inlet region 11a and 12 inches in diameter at the apex of the frusto-conical member 12b. The filter screen is about 30 inches long and 11 inches in diameter and loosely constrains a spherical float ball about 10 inches in diameter. The float shuts off flow to the outlet pipe 22 having about an 8 inch diameter.

A particular improvement of the present invention over the prior art is the minimal number of movable parts, specifically the float 42. The disclosed use of the filter screen to loosely constrain the ball float greatly simplifies operation of the cyclonic device and provides a reliable shut-off mechanism.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

What is claimed is:

1. A cyclonic device for separating entrained matter from a fluid stream under pressure comprising a combination of a vortex chamber, a filter member and a float, said vortex chamber being adapted to cause centrifugal separation of the entrained matter and having inlet and outlet means for providing a flow of the fluid stream first downwardly and then in an ascending vortex, said filter member being disposed in said vortex chamber and defining a region through which said ascending vortex flows and surrounding said float, said float being freely and buoyantly displaceable upwardly to close said outlet means as separated matter accumulates in said chamber.

2. A device as set forth in claim 1, wherein said chamber includes a longitudinally upright cylindrical portion substantially surrounding said inlet and outlet means and a frusto-conical portion subjacent said cylindrical portion, whereby said ascending vortex has a vertex located at an apical end of said frusto-conical portion.

3. A device as set forth in claim 2, wherein said filter member is a generally cylindrical screen concentrically disposed in said chamber and having one end adjacent said outlet means and an opposite end adjacent said apical end of said frusto-conical portion.

4. A device as set forth in claim 3, wherein said cylindrical screen is removeable through a lower portion of said chamber, and retention means are provided for preventing said screen from rotating about its longitudinal axis when said screen is disposed in said chamber.

5. A device as set forth in claim 3, wherein said float is a spherical ball of less density than said separated matter, said ball being freely constrained within said screen and bouyantly moveable towards said outlet means, said ball coacting with said outlet means to close the latter when a predetermined level of separated matter accumulates in said chamber.

6. A device as set forth in claim 5, wherein said chamber further includes a generally cylindrical clean-out portion subjacent said apical end of said frusto-conical portion, said clean-out portion providing a removable cover and access to said screen for removal of said screen from said chamber.

7. A device as set forth in claim 6, wherein said screen includes a horizontal floor portion preventing said ball from falling into said clean-out portion and a handle attached to said floor portion for removing said screen from said chamber.

8. A device as set forth in claim 7, wherein said retention means includes a slotted block mounted to an interior surface of said chamber and a strap mounted on said screen and adapted to be slideably inserted into a recess in said block, said block and strap coacting to prevent rotation of said screen and holding said screen within said chamber.

9. A device according to claim 1, wherein said filter member is a removable cylindrical screen and said float is a spherical ball having a diameter slightly less than said cylindrical screen diameter, said ball being loosely constrained by said screen to a direction of movement towards said outlet means as separated matter accumulates in said chamber.

10. A device according to claim 9, wherein said outlet means includes a pipe having a diameter less than said ball diameter, a portion of said pipe being concentrically disposed within said vortex chamber and adjacent one end of said cylindrical screen, said ball acting as a check valve to close said outlet pipe when a predetermined level of separated matter accumulates in said chamber.

11. A device for centrifugally separating entrained matter from a fluid stream under pressure comprising a cyclone chamber having a longitudinally upright cylindrical portion and a frusto-conical portion subjacent said cylindrical portion, the fluid stream enters said cyclone chamber through an inlet associated with said cylindrical portion and flows with a downward swirling action through said frusto-conical portion then upwardly in an ascending vortex to a chamber outlet, said ascending vortex having a vertex at said apical end of said conical portion, said swirling action causing centrifugal separation of relatively denser entrained matter from the fluid stream and said denser matter accumulates in said frusto-conical portion, filter means disposed in said cyclone chamber and defining a region through which said ascending vortex flows for filtering relatively less dense entrained matter from the fluid stream as the fluid stream enters said ascending vortex, and float means for closing said chamber outlet, said float means being positively buoyant with respect to the separated matter and freely displaceable upwardly as separated matter accumulates in said conical portion, said filter means loosely constraining said float means to a direction of movement generally axial with said ascending vortex towards said chamber outlet.

* * * * *

UNITED STATES PATENT AND TRADEMARK OFFICE
CERTIFICATE OF CORRECTION

PATENT NO. : 4,572,783

DATED : February 25, 1986

INVENTOR(S) : Cedric H. Watson

It is certified that error appears in the above—identified patent and that said Letters Patent is hereby corrected as shown below:

IN THE ABSTRACT:

Line 11, after "through", insert --which--.

Signed and Sealed this

Seventeenth Day of June 1986

[SEAL]

Attest:

DONALD J. QUIGG

Attesting Officer

Commissioner of Patents and Trademarks